US012759101B2

(12) United States Patent
Dutter

(10) Patent No.: US 12,759,101 B2
(45) Date of Patent: Oct. 13, 2026

(54) SYSTEMS AND METHODS FOR REMOVING A CAP SEAL FROM A FASTENER

(71) Applicant: THE BOEING COMPANY, Arlington, VA (US)

(72) Inventor: Jason P. Dutter, Arlington, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/273,248

(22) Filed: Jul. 18, 2025

(65) Prior Publication Data

US 2026/0175334 A1 Jun. 25, 2026

Related U.S. Application Data

(60) Provisional application No. 63/735,971, filed on Dec. 19, 2024.

(51) Int. Cl.
*B23P 19/04* (2006.01)
*F16B 41/00* (2006.01)

(52) U.S. Cl.
CPC ............ *B23P 19/04* (2013.01); *F16B 41/002* (2013.01)

(58) Field of Classification Search
CPC ........ B23P 19/04; F16B 41/002; B05C 17/00; A47L 13/08; B29C 66/032
See application file for complete search history.

(56) References Cited

U.S. PATENT DOCUMENTS

| | | | | |
|---|---|---|---|---|
| 3,837,244 | A * | 9/1974 | Schera, Jr. | B25B 13/06 81/64 |
| 9,295,367 | B2 * | 3/2016 | Wiseman | B05C 17/10 |
| 9,352,509 | B1 * | 5/2016 | Kesterson | B29C 63/0013 |
| 9,802,297 | B2 * | 10/2017 | Marchand | B25B 13/065 |
| 10,259,018 | B2 * | 4/2019 | Wiseman | B08B 1/165 |
| 10,800,150 | B2 * | 10/2020 | Westover | B32B 43/006 |
| 2006/0150778 | A1 * | 7/2006 | Hennessey | B25B 13/48 81/3.44 |

(Continued)

FOREIGN PATENT DOCUMENTS

| | | | |
|---|---|---|---|
| CH | 687 861 | 3/1997 | |
| CH | 687861 A5 * | 3/1997 | B25B 27/0057 |

(Continued)

OTHER PUBLICATIONS

Extended European Search Report for EP App. No. 25215502-3-1015, dated Apr. 14, 2026.

*Primary Examiner* — Bayan Salone
(74) *Attorney, Agent, or Firm* — Joseph M. Butscher; Carroll, Hoette & Butscher, LLC

(57) ABSTRACT

A system for removing a cap seal from a fastener, includes a seal remover including fingers outwardly extending from a base. The fingers include one or more first fingers and one or more second fingers. The one or more first fingers are sized, shaped, or configured differently than the one or more second fingers. Passages are defined between the fingers. The seal remover is configured to be coupled to a distal end of an operative portion of a tool. The tool is configured to be operated to rotate the seal remover in relation to the cap seal so that the fingers remove the cap seal from the fastener. Removed portions of the cap seal are discharged through and out of the passages.

20 Claims, 10 Drawing Sheets

(56) References Cited

U.S. PATENT DOCUMENTS

| | | | | |
|---|---|---|---|---|
| 2014/0017021 | A1* | 1/2014 | Bellino | B23B 5/167 408/203.5 |
| 2017/0259306 | A1* | 9/2017 | Wiseman | F16B 37/14 |
| 2018/0345645 | A1* | 12/2018 | Westover | B32B 38/10 |
| 2025/0135504 | A1* | 5/2025 | Dutter | B08B 1/32 |

FOREIGN PATENT DOCUMENTS

| | | | | |
|---|---|---|---|---|
| CN | 211100337 | | 7/2020 | |
| CN | 211100337 | U * | 7/2020 | |
| CN | 216229131 | | 4/2022 | |
| CN | 216229131 | U * | 4/2022 | |
| JP | H07331861 | | 12/1995 | |
| JP | H07331861 | A * | 12/1995 | |
| KR | 20202000612 | | 3/2022 | |
| WO | WO 02/20205 | | 3/2002 | |
| WO | WO-0220205 | A2 * | 3/2002 | B23C 5/10 |
| WO | WO 2013/036235 | | 3/2013 | |
| WO | WO-2013036235 | A1 * | 3/2013 | B23B 5/167 |

* cited by examiner

SYSTEMS AND METHODS FOR REMOVING A CAP SEAL FROM A FASTENER

CROSS-REFERENCE TO RELATED APPLICATION

This application relates to and claims priority benefits from U.S. Provisional Patent Application No. 63/735,971, filed Dec. 19, 2024, which is hereby incorporated by reference in its entirety.

FIELD OF THE DISCLOSURE

Examples of the present disclosure generally relate to systems and methods for removing a cap seal from a fastener.

BACKGROUND OF THE DISCLOSURE

Various components are connected together by fasteners. For example, a commercial aircraft includes numerous panels, frames, and the like that are secured together through fasteners, such as bolts, screws, and/or nuts. Cap seals can be secured over heads of fasteners and/or nuts secured to threaded shafts. For example, polysulfide cap seals can be securely cured to fasteners, such as fasteners disposed on an interior of a fuel storage tank of a wing of an aircraft.

For various reasons, the cap seals may need to be removed from the fasteners, such as if the components need to be separated during a maintenance procedure, fasteners need to be replaced, or the like. In order to remove a cap seal, an individual typically uses an acrylic scraper to manually scrape away the material of the cap seal. As an example, an aircraft mechanic may need to remove bolts for rework and maintenance. In order to perform such work, the individual mechanic typically needs to remove a polysulfide cap seal to gain access to a nut of the fastener, so that a socket can be used to remove the nut. As can be appreciated, the mechanic may need to remove numerous cap seals during a maintenance procedure. However, manually removing cap seals with a scraper can be tedious, ergonomically difficult, and time consuming.

SUMMARY OF THE DISCLOSURE

A need exists for an efficient and effective system and method for removing a cap seal from a fastener.

With that need in mind, certain examples of the present disclosure provide a system for removing a cap seal from a fastener. The system includes a seal remover including fingers outwardly extending from a base. The fingers include one or more first fingers and one or more second fingers. The one or more first fingers are sized, shaped, or configured differently than the one or more second fingers. Passages are defined between the fingers. The seal remover is configured to be coupled to a distal end of an operative portion of a tool. The tool is configured to be operated to rotate the seal remover in relation to the cap seal so that the fingers remove the cap seal from the fastener. Removed portions of the cap seal are discharged through and out of the passages.

In at least one example, the one or more first fingers include one first finger, and the one or more second fingers include three second fingers.

In at least one example, the one or more first fingers include a flat distal tip, and the one or more second fingers include a groove. The groove can include an arcuate base. The groove can be outwardly angled.

One or both of the one or more first fingers or the one or more second fingers can include serrations.

In at least one example, the system also includes the tool. The seal remover can be integrally formed with the distal end of the operative portion of the tool. Optionally, the seal remover can be removably secured to the distal end of the operative portion of the tool. In at least one example, the tool includes an actuator coupled to a proximal end of the operative portion.

The fingers can be deflectable and configured to frictionally engage the cap seal.

The seal remover can be formed from a polymer. The seal remover can be formed from one or more of nylon, rubber, polyetherimide, or polyacetal.

In at least one example, the fingers are disposed around a central receiving chamber configured to receive the cap seal.

Certain examples of the present disclosure provide a method for removing a cap seal from a fastener. The method includes coupling a seal remover to a distal end of an operative portion of a tool, wherein the seal remover includes fingers outwardly extending from a base, wherein the fingers include one or more first fingers and one or more second fingers, wherein the one or more first fingers are sized, shaped, or configured differently than the one or more second fingers, and wherein passages are defined between the fingers; operating the tool to rotate the seal remover in relation to the cap seal; removing the cap seal by said operating; and discharging removed portions of the cap seal through and out of the passages.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Figure 1:
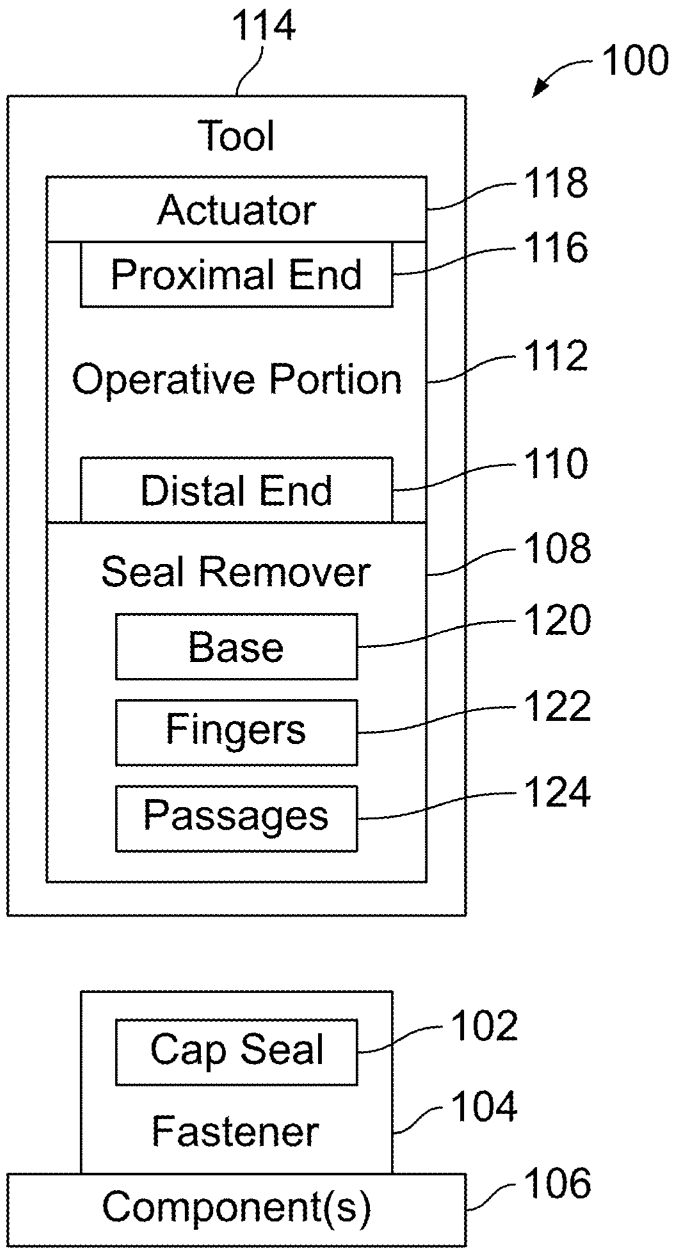
FIG. 1 illustrates a block diagram of a system for removing a cap seal from a fastener, according to an example of the present disclosure.

FIG. 1 illustrates a block diagram of a system 100 for removing a cap seal 102 from a fastener 104, according to an example of the present disclosure. The various blocks in the diagram of FIG. 1 are arranged to facilitate the following explanation, rather than to require or imply any particular configuration of the physical objects that are represented by the blocks. The fastener 104 is used to secure components 106 together. The components 106 can be panels, frame, beams, blocks, walls, and/or the like. The fastener 104 can be a screw, bolt, or the like having a shaft, which can be threaded, a head, and/or a nut. The cap seal 102 is initially secured to a portion of the fastener 104, such as the head or the nut. In at least one example, the cap seal 102 is formed from a polysulfide sealant, and is cured onto the fastener 104.

The system 100 includes a seal remover 108 coupled to a distal end 110 of an operative portion 112 of a tool 114. The tool 114 can be a drill, a right angle nut runner, or the like. The operative portion 112 can be a drill bit, a shaft, or the like that is configured to rotate about a central longitudinal axis. The operative portion 112 includes a proximal end 116 opposite from the distal end 110. The proximal end 116 can be operatively coupled to an actuator 118, such as a motor, which is configured to automatically rotate the operative portion. Alternatively, the tool 114 may not include the actuator 118. Instead, the operative portion 112 can be configured to be manually rotated.

In at least one example, the seal remover 108 is removably coupled to the distal end 110. For example, the seal remover 108 is an attachment that removably secures to the distal end 110, such as via one or more fasteners, snaps, latches, and/or the like. In this manner, the seal remover 108 can be selectively secured to and removed from the distal end 110. As another example, the seal remover 108 can be integrally formed with the operative portion 112. In particular, the seal remover 108 can form the distal end 110 of the operative portion 112.

The seal remover 108 includes a base 120, fingers 122 extending outwardly from the base 120 (that is, extending away from the distal end 110 of the operative portion 112 of the tool 114), and passages 124 between the fingers 122. For example, the fingers 122 can extend radially outward from a distal surface (away from the tool 114) of the base 120. The fingers 122 are configured to remove the cap seal 102 from the fastener 104, such as by abrading, grinding, frictionally rubbing, scrubbing, and/or cutting the cap seal 102 away from the fastener 104. The passages 124 allow for removed material from and/or portions of the cap seal 102 to discharge from the seal remover 108 during operation.

In at least one example, all of the fingers 122 are sized, shaped, and configured the same. That is, the fingers 122 are identical to one another.

In at least one other example, a first subset of the fingers are sized, shaped, and configured the same, while a second subset of the fingers 122 are sized, shaped, and/or configured differently than the first subset. As an example, two or more of the fingers 122 can include a groove at a distal tip, while at least one other of the fingers 122 does not include a groove, but rather has a flat distal tip, which is configured to scrape away excess material. As a further example, the seal remover 108 includes four fingers 122, in which three fingers 122 include a groove at a distal tip, while the fourth finger 122 does not include a groove, but instead has a flat distal tip. In at least one example, the seal remover 108 includes multiple fingers 122, and at least one of the fingers 122 differs in one or more size, shape, or configuration (for example, may or may not include a groove, or has a groove sized, shaped, or oriented differently) than one or more other fingers 122.

In operation, the tool 114 is moved into proximity of the cap seal 102, so that the fingers 122 engage (for example, are urged into and contact) one or more portions of the cap seal 102, for example, the exterior surface thereof. As the fingers 122 contact the cap seal 102, the tool 114 is operated to rotate the operation portion 112, and therefore the seal remover 108. For example, the actuator 118 can be activated to rotate the operative portion 112. As the operative portion 112 rotates, the fingers 122 of the seal remover 108 rotate about a central longitudinal axis of the operative portion 112. The rotation of the fingers 122 on and around the cap seal 102 acts to remove the cap seal 102 from the fastener 104, such as by abrading, grinding, scrubbing, frictionally rubbing, and/or cutting portions of the cap seal 102 away from the fastener 104. As portions of the cap seal 102 are removed from the fastener 104, the removed portions are centripetally accelerated away from the fastener 104, and are discharged out and through the passages 124 as the seal remover 108 continues to rotate. The tool 114 continues to be operated to rotate the seal remover 108 (and may be continually urged toward the cap seal 102) until the cap seal 102 is removed from the fastener 104.

As described herein, the system 100 for removing the cap seal 102 from the fastener 104 includes the seal remover 108 including the fingers 122 outwardly extending from the base 120. Passages 124 are defined between the fingers 122. The seal remover 108 is configured to be coupled to the distal end 110 of the operative portion 112 of the tool 114. The tool 114 is configured to be operated to rotate the seal remover 108 in relation to the cap seal 102 so that the fingers 122 remove the cap seal 102 from the fastener 104. Removed portions of the cap seal 102 are discharged through and out of the passages 124.

Figure 2:
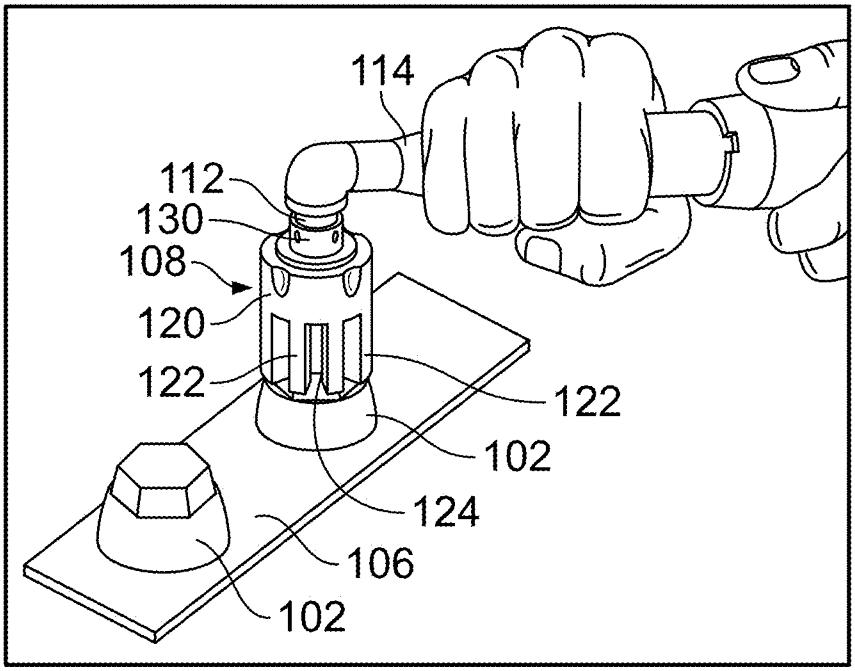
FIG. 2 illustrates a perspective top view of the system being operated to remove a cap seal, according to an example of the present disclosure.

FIG. 2 illustrates a perspective top view of the system 100 being operated to remove a cap seal 102, according to an example of the present disclosure. As shown, the tool 114 can be a hand held tool, such as a nut runner, having an operative portion 112, such as rotatable shaft. The seal remover 108 includes the base 120, which can be secured to an adapter 130, such as a chuck, which is coupled to, or forms part of, the operative portion 112. Optionally, the adapter 130 can be part of the seal remover 108. The base 120 and the fingers 122 can be formed of a resilient material, such as a polymer, rubber, or the like. As examples, the seal remover 108 can be formed of nylon, rubber, polyetherimide, a polyacetal, and/or the like. If flexibility is desired, the seal remover 108 can be formed of a material, such as nylon or rubber. If a more rigid material is desired, the seal remover 108 can be formed of polyetherimide, polyacetal, or the like.

As shown, in order to remove the cap seal 102, the seal remover 108 is disposed onto and over the cap seal 102, such that the fingers 122 are disposed over and around an exposed end of the cap seal 102. The tool 114 is then operated to rotate the seal remover 108. As the seal remover 108 is rotated, the fingers 122 engage the material of the cap seal 102. In at least one example, as the seal remover 108 is urged onto the cap seal 102, the fingers 122 can outwardly flex and deflect over engaged portions of the cap seal 102, thereby providing increased friction therebetween. As the tool 114 is operated to rotate the seal remover 108, the fingers 122 rotate around the engaged portions of the cap seal 102, thereby removing portions of the cap seal 102, such as by abrading, griding, scrubbing, frictionally rubbing, and/or cutting away portions of the cap seal 102.

Figure 3:
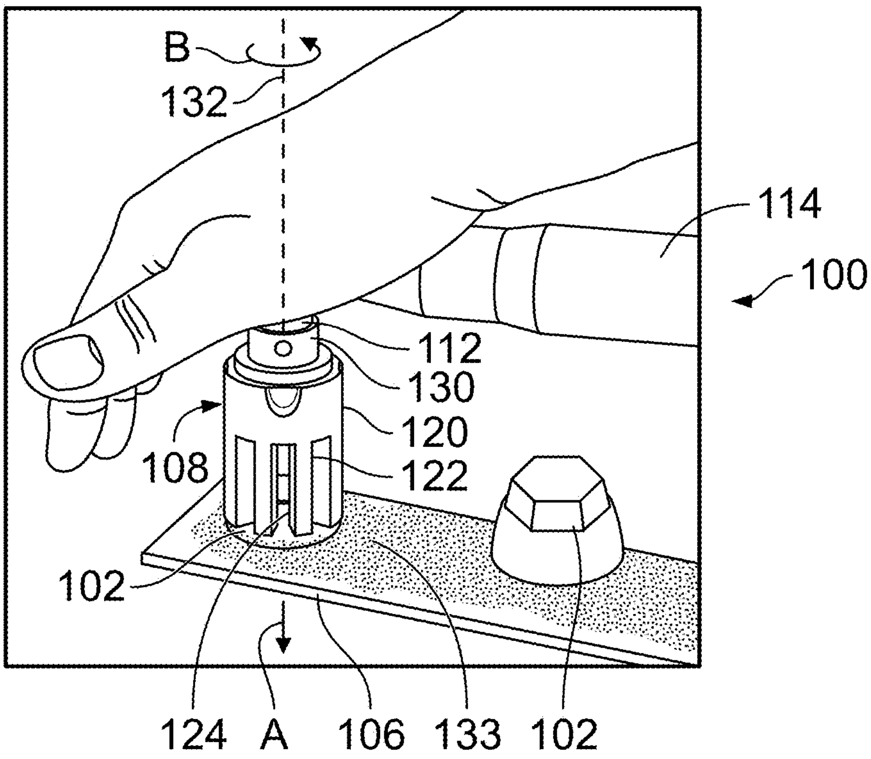
FIG. 3 illustrates a perspective side view of the system of FIG. 2 being operated to remove the cap seal.

FIG. 3 illustrates a perspective side view of the system 100 of FIG. 2 being operated to remove the cap seal. Referring to FIGS. 2 and 3, as the tool 114 is operated to urge the seal remover 108 further into the cap seal 102 in the direction of arrow A, and the seal remover 108 continues to rotate about a central longitudinal axis 132 of the operative portion 112 in the direction of arc B (such as a counter-clockwise direction), the fingers 122 frictionally engage the cap seal 102, and remove portions thereof, which are discharged out of the passages 124 via centripetal acceleration. Optionally, the seal remover 108 can be rotated in a direction that is opposite of arc B (such as in a clockwise direction). The removed portions of the cap seal 102 can be discharged as sealant residue 133.

Figure 4:
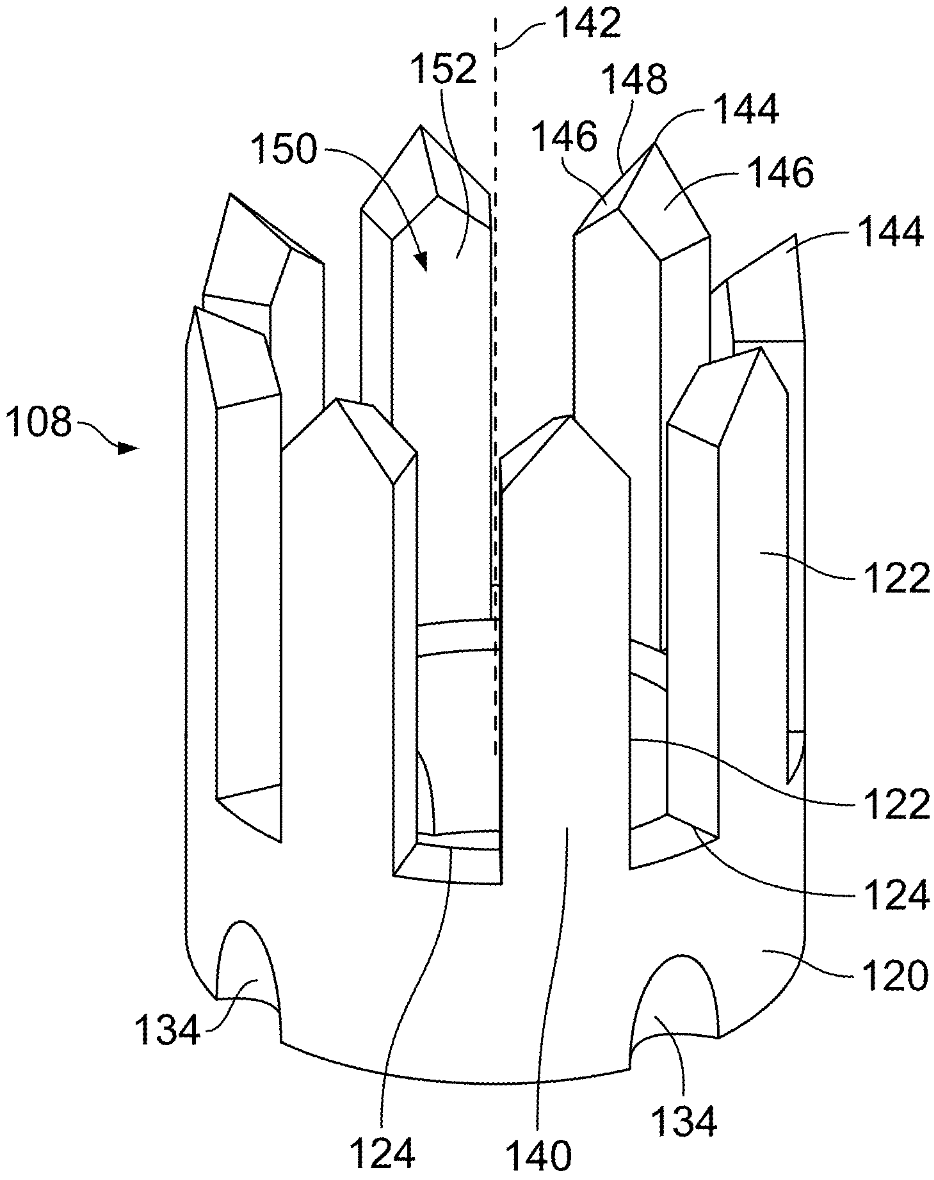
FIG. 4 illustrates a perspective view of a seal remover, according to an example of the present disclosure.

FIG. 4 illustrates a perspective view of a seal remover 108, according to an example of the present disclosure. Referring to FIGS. 1-4, the seal remover 108 includes the base 120, such as a circumferential main body. The base 120 can include one or more channels 134 configured to receive one or more pins, clips, screws, and/or the like that are configured to secure the seal remover 108 to the distal end 110 of the operative portion 112, such as via the adapter 130.

The fingers 122 outwardly extend from the base 120. Each finger 122 includes an extension beam 140 that is generally parallel with a central longitudinal axis 142 of the seal remover 108. The extension beam 140 extends from the base 120. When the seal remover 108 is connected to the distal end 110 of the operative portion 112, the central longitudinal axis 142 is coaxial with the central longitudinal axis 132 (shown in FIG. 3). A tooth 144 extends from an end of each extension beam 140 opposite from the base 120. Each tooth 144 includes slanted edges 146 that converge at a sharp apex 148. Thus, the fingers 122 includes teeth 144 that are configured to dig, cut, and/or the like into the cap seal 102 in order to remove the cap seal 102 as the seal remover 108 rotates.

In at least one example, the fingers 122 can be serrated, such as on or proximate edges. For example, each tooth 144 can include flat or slanted edges with a serrated end, which effectively grinds a polysulfide sealant material.

As shown, the seal remover 108 can include eight regularly-spaced circumferential fingers 122 disposed around a central receiving chamber 150. The receiving chamber 150 is sized and shaped to allow reception of the cap seal 102. As noted, the fingers 122 can be configured to outwardly deflect as the fingers 122 contact the cap seal 102. The flexible fingers 122 exert frictional force into the cap seal 102, which increases the rate of removal of material from the cap seal 102. As the seal remover 108 is rotated on and around the cap seal 102, the teeth 144 dig into the cap seal 102, and inner surfaces 152 of the extension beams 140 frictionally engage the cap seal 102, thereby causing portions of the cap seal 102 to break away, and discharge through the passages 124 as the sealant residue 133.

During a removal process, the fingers 122 follow a contour of the cap seal 102 and underlying portion of the fastener 104 (such as a nut) by deflection and flexion, thereby allowing for quick removal of the cap seal 102 from the fastener 104. As the tool 114 is operated to rotate the seal remover 108, the fingers 122 flex scrape off the cap seal 102 in a fast and clean pass, which is quicker and more efficient than removing the cap seal 102 with a plastic scraper. The seal remover 108 can be formed from a polymer, as noted, instead of a metal, which ensures that the seal remover 108 does not damage the underlying fastener 104.

As shown, each of the fingers 122 is sized, shaped, and configured the same. Optionally, at least one of the fingers 122 can be sized, shaped, and configured differently from the other fingers 122. As an example, one of the fingers 122 can have a flat, blunt distal end instead of a tooth 144. The flat, blunt distal end can extend to the same height as the teeth 144 of the other fingers 122. The flat, blunt distal end is used to scrape material away from a component.

Optionally, the seal remover 108 can include more or fewer fingers 122 than shown. For example, the seal remover 108 can include three, four, five, six, seven, nine, or more fingers 122 instead of eight.

FIG. 4 shows an example of the seal remover 108. It is to be understood that the size, shape, and various features shown in FIG. 4 can be different than shown. For example, the spacing between the fingers 122 can be greater or less than shown. Additionally, the fingers 122 can be longer, shorter, wider, or thinner than shown. The spacing between the fingers 122 can be uniform, or can differ between different sets of fingers 122. The lengths and widths of the extension beams 140 can be greater or less than shown. The number and orientation of cutting edges on the extension beams 140 and/or teeth 144 can vary from what is shown in FIG. 4.

Additionally, the extension beams 140 can be more or less flexible. The degree to which the extension beams 140 deflect from vertical can vary, depending on a desired amount of flexibility (or rigidity). As such, an amount of force that each cutting surface exerts into the cap seal 102 can vary, as desired.

The seal remover 108 shown and described in FIG. 4 can be a general device that is useful with various different types of fastener shapes and sizes. The seal remover 108 can be adapted and customized for a particular application, such as with respect to certain sizes and shapes of fasteners. The fingers 122 (including the extension beams 140 and the teeth 144) can be customized for a specific type of fastener profile, such as by shaping engaging/cutting edges specifically to complement an outer shape of a specific fastener type. Additionally, the material from which the seal remover 108 is fabricated may also be modified, such as by machining the teeth to have a desired orientation and/or position.

Figure 5:
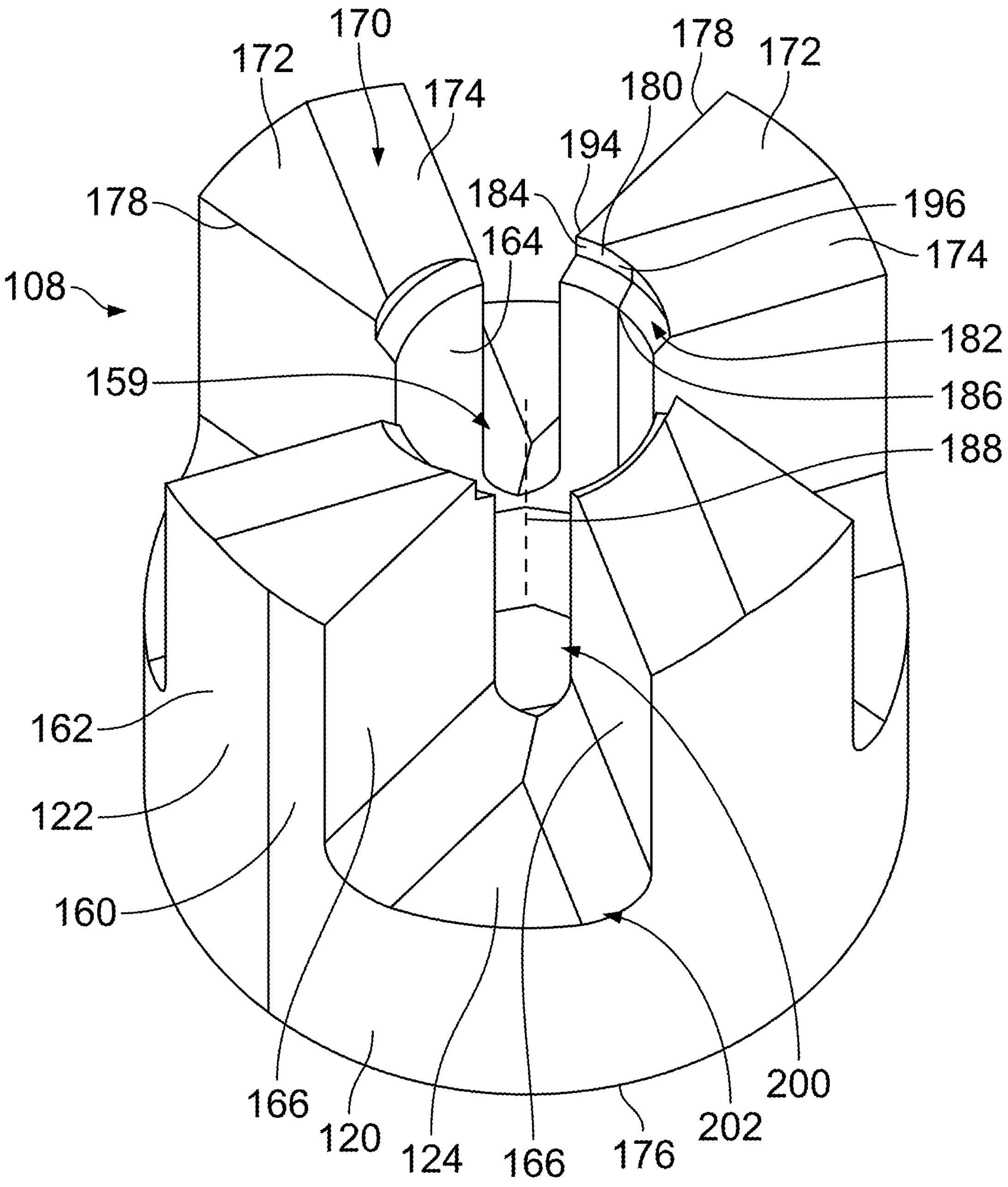
FIG. 5 illustrates an isometric view of a seal remover, according to an example of the present disclosure.

FIG. 5 illustrates an isometric view of a seal remover 108, according to an example of the present disclosure. The seal remover 108 shown in FIG. 5 is an example of a customized device, which can be configured to remove a cap seal from a fastener having a particular shape. For example, the seal remover 108 shown in FIG. 5 can be customized and configured to remove a cap seal from an aerospace major structure fastener, such as can be formed of Inconel, and configured to join a wing to a body structure of an aircraft. Referring to FIGS. 1 and 5, the fingers 122 can be configured to cut around portions of the cap seal 102. The fingers 122 are disposed around a central receiving chamber 159 configured to receive the cap seal 102. Each finger 122 includes a wedge-shaped main body 160 outwardly extending from the base 120. The main body 160 includes an arcuate outer wall 162 connected to an arcuate inner wall 164 by sidewalls 166 that angle toward each other from the outer wall 162 to the inner wall 164. As such, the outer wall 162 is larger (that is, extends over a greater radial distance) than the inner wall 164. The fingers 122 also includes an exposed cutting end 170 that connects to and over the outer wall 162 and the inner wall 164. The cutting end 170 includes a flat leading surface 172 connected to a beveled trailing surface 174. The flat leading surface 172 can be in a plane that is parallel to a plane in which a flat bottom surface 176 of the base 120 resides. The beveled trailing surface 174 downwardly cants from the flat leading surface 172. A leading edge 178 of the leading surface 172 can be sharp and configured to cut into the cap seal 102, while the beveled trailing surface 172 allows residue from the cut material of the cap seal 102 to fall away and off the cutting end 170.

As shown, each finger 122 can also include a cutting groove 180 on an interior surface 182 at a junction of the inner wall 164 and the cutting end 170. The cutting groove 180 includes an upright wall 184 connected to an angled wall 186 that downwardly cants toward a central longitudinal axis 188. The upright wall 184 includes an expanded leading edge 194 that connects to a tapered portion 196 that terminates in a tapered trailing edge 196. It has been found that the shapes of the cutting grooves 180 and the cutting ends 170 efficiently cut into the cap seal 102 as the tool 114 is operated.

Each passage 124 is defined between a sidewall 166 of a finger 122, and a sidewall 166 of a neighboring finger 122 (that is, a finger closest to a finger 122. The passages 124 include an inboard inlet 200 and an outboard outlet 202. The inlet 200 is smaller than the outlet 202. The passages 124 are also wedge shaped, and the expanded size of the outlet 202 in relation to the inlet 200 allows for quick and efficient removal of removed portions of the cap seal 102 during operation of the tool 114.

The cutting edges of each fingers 122, such as including the cutting groove 180 and the cutting end 170, and the passages 124 are configured to tightly conform to a size and shape of a portion of a fastener 104 so that cutting action rotates around the fastener 104 and clears the sealant quickly and efficiently, such as in under fifteen seconds.

Optionally, the seal remover 108 can include more or fewer fingers 122 than shown. For example, the seal remover 108 can include three, five, six, seven, eight, or more fingers 122 instead of four.

Referring to FIGS. 1-5, in at least one example, the seal remover 108 can include at least one finger 122 that is shaped as shown and described in relation to FIG. 4, and at least one other finger 122 that is shaped as shown and described in relation to FIG. 5.

Figure 6:
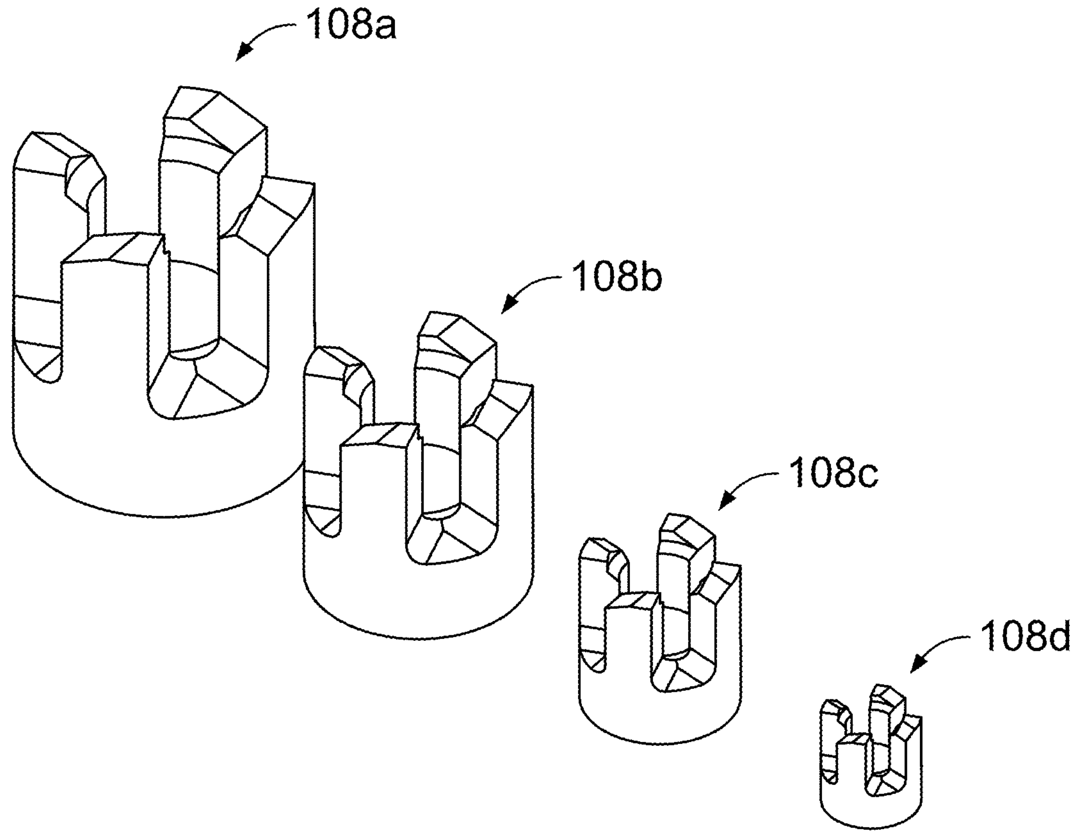
FIG. 6 illustrates an isometric view of seal removers, according to an example of the present disclosure.

FIG. 6 illustrates an isometric view of seal removers 108*a*, 108*b*, 108*c*, and 108*d*, according to an example of the present disclosure. Referring to FIGS. 1, 5, and 6, the seal removers 108*a*-108*d* can be shaped the same as one another, but have different sizes. In this manner, a seal remover 108*a*-108*d* can be selectively secured to, removed from, and replaced in relation to the distal end 110 based on a size of the cap seal 102. Seal removers 108 as shown in FIG. 4 can also include different sizes.

Referring to FIGS. 1-6, the seal removers 108 can be integrally molded and formed as a single piece, such as a from a plastic or rubber. In at least one example, the seal removers 108 can be formed via additive manufacturing.

It has been found that the seal removers 108 as shown and described herein reduce a time of removal of a cap seal 102 from a portion of a fastener 104 by at least 75%, and upwards of 95%. Further, by coupling the seal remover 108 to the tool 114 (instead of using a separate scraper), there is little to no risk of injury from slipping off a cap seal. Additionally, removal time can be further reduced by using a seal remover 108 that is customized to a particular fastener size and/or shape.

The fingers 122, such as cutting surfaces thereof, can be resharpened. For example, a flat hand file can be used to sharpen the cutting surfaces.

Figure 7:
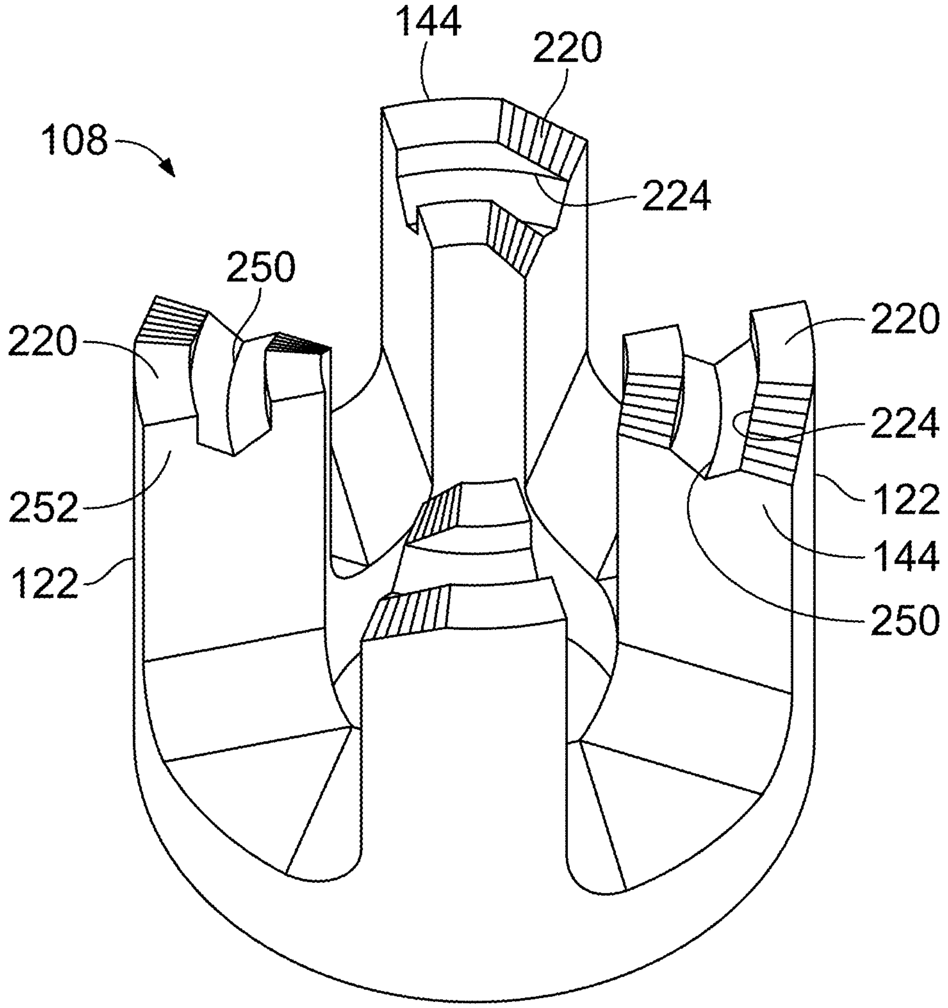
FIG. 7 illustrates a perspective view of a seal remover, according to an example of the present disclosure.

FIG. 7 illustrates a perspective view of a seal remover 108, according to an example of the present disclosure. Cutting surfaces of the fingers 122 can include serrations 220. The serrations 220 can be on exposed edges 224, such as at terminal ends 252. For example, each tooth 144 can include flat or slanted edges with serrations 220, which effectively grind a polysulfide sealant material.

One or more of the fingers 122 can also include a groove 250, such as a transverse V-shaped groove at a terminal end 252, In at least one example, the finger(s) 144 can include the groove 250, but not the serrations 220. Any of the embodiments described herein can include serrations, such as the serrations 220, and/or grooves, such as the groove 250.

As shown, each of the fingers 122 is sized, shaped, and configured the same. Optionally, at least one of the fingers 122 can be sized, shaped, and configured differently from the other fingers 122. As an example, one of the fingers 122 can have a flat, blunt distal end instead of having a groove 250. The flat, blunt distal end can extend to the same height as the teeth 144 of the other fingers 122. The flat, blunt distal end is used to scrape material away from a component.

In at least one example, three of the fingers 122 are sized, shaped, and configured identical to one another as shown in FIG. 7. In contrast, a fourth finger is sized, shaped, and/or configured differently than the other three fingers 122. For example, the fourth finger 122 can be sized, shaped, and configured to have the cutting end 170 as shown in FIG. 5.

Figure 8:
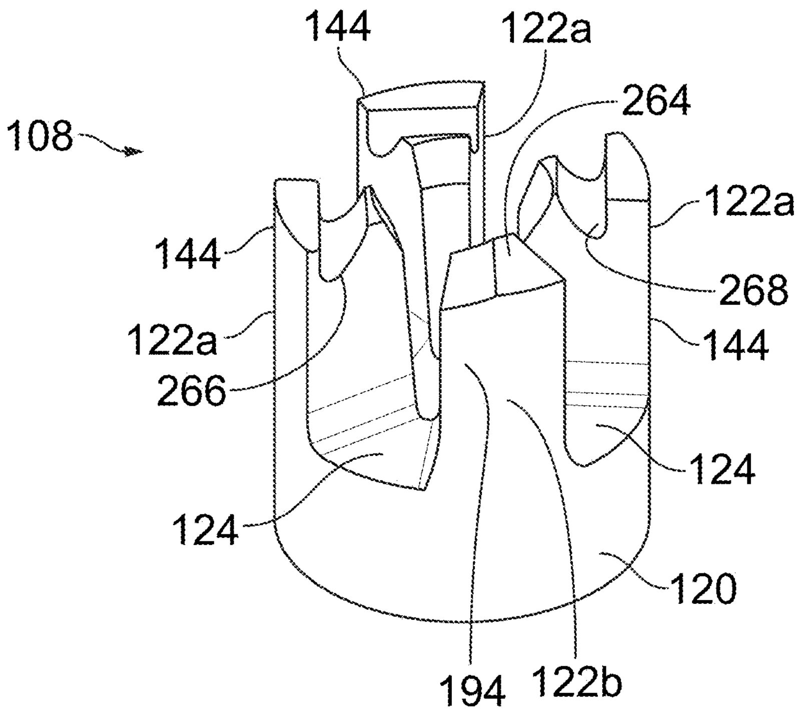
FIG. 8 illustrates an isometric view of a seal remover, according to an example of the present disclosure.
Figure 9:
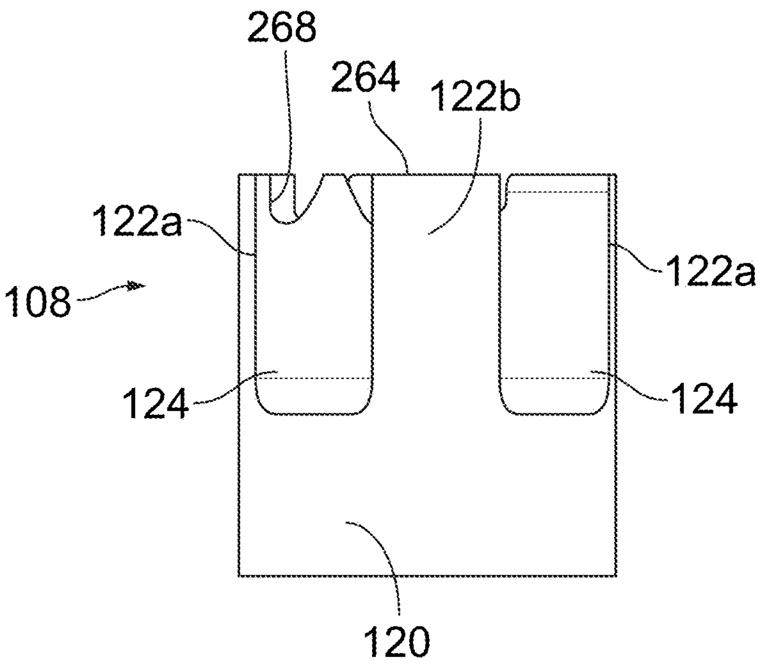
FIG. 9 illustrates a side view of the seal remover of FIG. 8.
Figure 10:
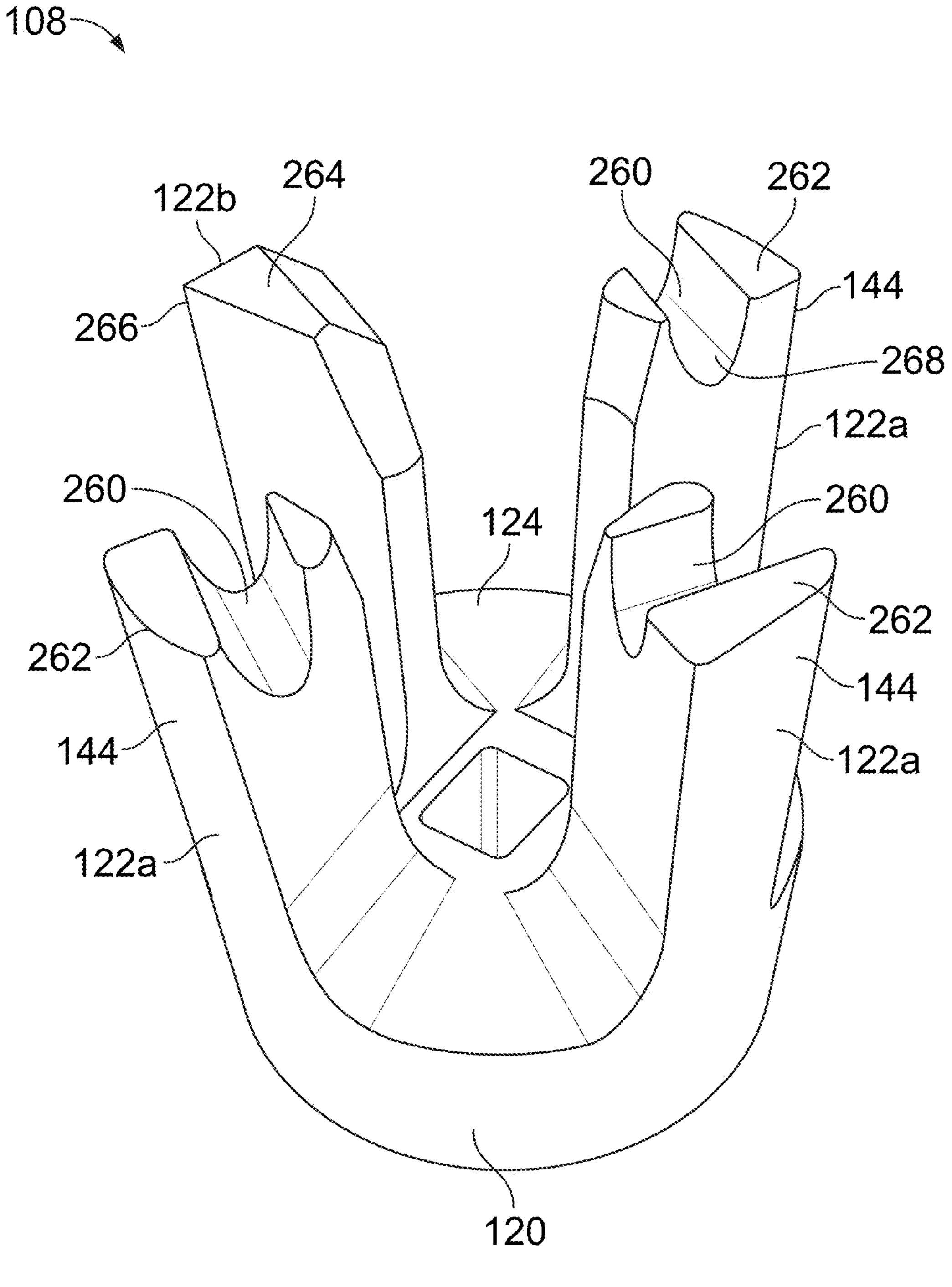
FIG. 10 illustrates a perspective top view of the seal remover of FIG. 8.
Figure 11:
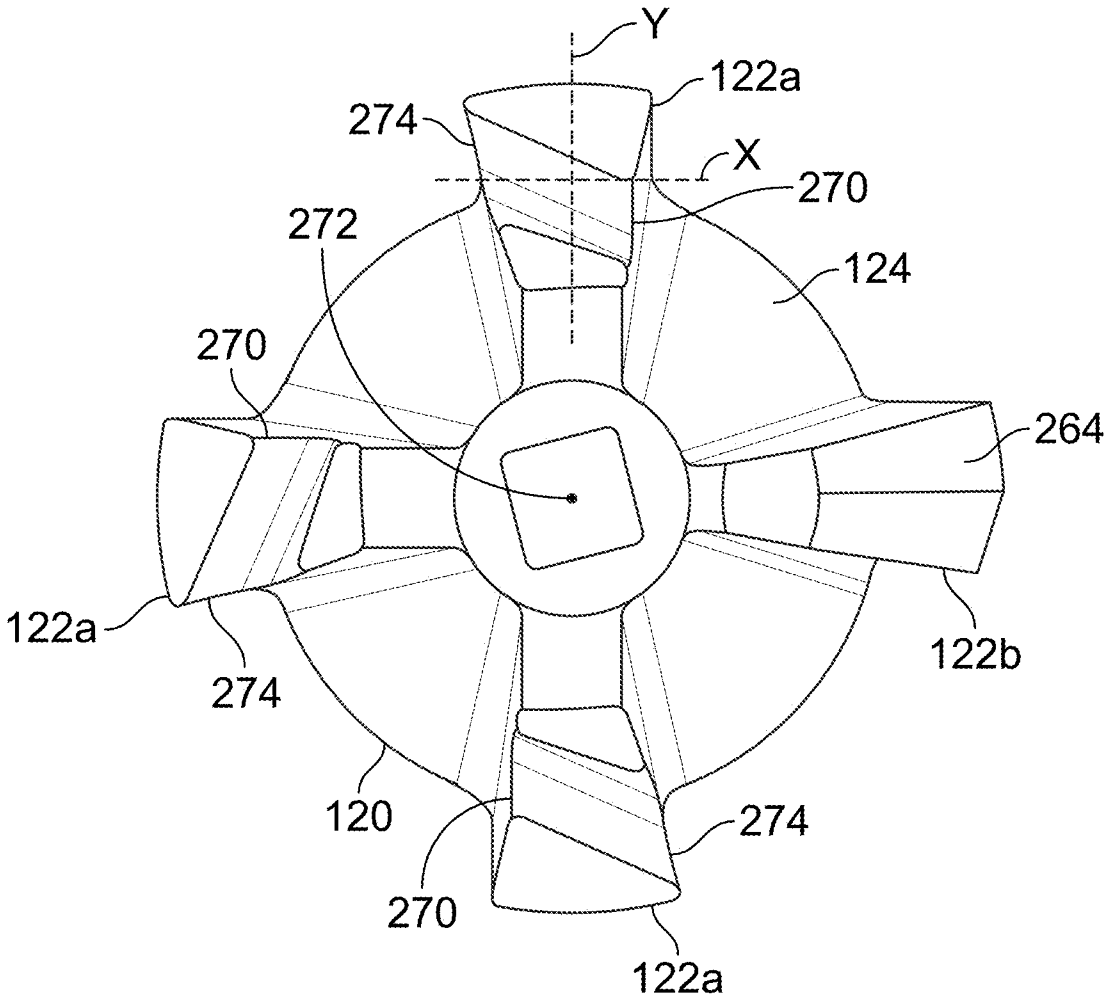
FIG. 11 illustrates a top view of the seal remover of FIG. 8.

FIG. 8 illustrates an isometric view of a seal remover 108, according to an example of the present disclosure. FIG. 9 illustrates a side view of the seal remover 108 of FIG. 8. FIG. 10 illustrates a perspective top view of the seal remover 108 of FIG. 8. FIG. 11 illustrates a top view of the seal remover 108 of FIG. 8. Referring to FIGS. 8-11, the seal remover 108 includes three fingers 122*a*, and one finger 122*b*. The three fingers 122*a* are sized, shaped, and configured the same, while the finger 122*b* differs from the three fingers 122*a*. In particular, the fingers 122*a* include a groove 260 formed in a distal tip 262. In contrast, the finger 122*b* does not include a groove, but instead has a flat distal surface 264 at a distal tip 266.

The groove 260 can be have an arcuate base 268, such as a transverse rounded V-shaped or U-shaped groove. In at least one example, the finger(s) 122*a* can include the groove 260, but not the serrations. Any of the embodiments described herein can include serrations, such as the serrations 220, and/or grooves, such as the groove 260.

As shown in FIG. 11, the grooves 260 have a first end 270 that is closer to a central longitudinal axis 272 of the seal remover 108 than an opposite second end 274. As such, the grooves 260 outwardly angle in relation to distal ends of the fingers 122*a*. In particular, the grooves 260 are not parallel with, or otherwise longitudinally aligned with an X axis or a Y axis of the fingers 122*a*. Instead, the grooves 260 are canted in relation to the X axis and the Y axis.

The first end 270 provides an inlet for material, while the second end 274 provides an outlet for the material. Because the grooves 260 are angled, removed material enters the inlets of the first ends 270, pass through the grooves 260, and are ejected through the outlets of the second ends 274. The outwardly-oriented angles of the grooves 260 ensure that the removed material is ejected away from the fingers 122*a*, and is not deposited into the passages 124, for example.

As shown, all four of the fingers 122*a* and 122*b* are parallel with one another (that is, the longitudinal axes of the fingers 122*a* and 122*b* are parallel). The grooves 260 of the three fingers 122*a* provide cutting surfaces to remove sealant, for example. The flat, upper surface of the fingers 122*b* provides chip relief, for example, and operates to scrape any remaining sealant from a component.

As noted, the finger 122*b* has the flat distal surface 264, instead of having a groove like the fingers 122*a*. In at least one example, the fingers 122*b* can be sized, shaped, and configured as the exposed cutting end 170 shown in FIG. 5.

The seal remover 108 shown in FIGS. 8-11 includes four spaced-apart fingers 122*a* and 122*b*. Optionally, the seal remover 108 can have more or fewer fingers than shown. For example, the seal remover 108 can include two fingers 122*a* and one finger 122*b*. As another example, the seal remover 108 can include four fingers 122*a* and one finger 122*b*. As another example, the seal remover 108 can include three fingers 122*a* and two or three fingers 122*b*. As another example, the seal remover 108 can include one finger 122*a* and three fingers 122*b*.

Figure 12:
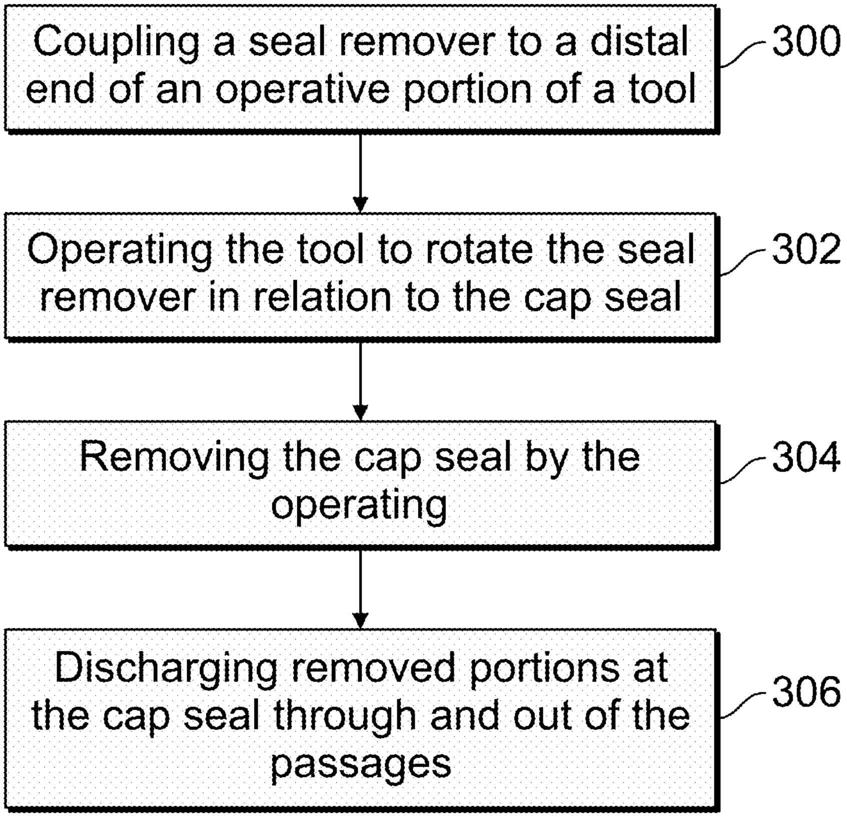
FIG. 12 illustrates a flow chart of a method, according to an example of the present disclosure.

FIG. 12 illustrates a flow chart of a method, according to an example of the present disclosure. Referring to FIGS. 1 and 8, the method is for removing the cap seal 102 from the fastener 104. The method includes coupling, at 300, the seal remover 108 to the distal end 110 of the operative portion 112 of the tool 114. The seal remover 108 includes the fingers 122 outwardly extending from the base 120. The passages 124 are defined between the fingers 122. The method also includes operating, at 302, the tool 114 to rotate the seal remover 108 in relation to the cap seal 102, removing, a 304, the cap seal 102 by the operating 302, and discharging, at 306, removed portions of the cap seal 102 through and out of the passages 124.

Further, the disclosure comprises embodiments according to the following clauses:

Clause 1. A system for removing a cap seal from a fastener, the system comprising:

a seal remover including fingers outwardly extending from a base, wherein the fingers include one or more first fingers and one or more second fingers, wherein the one or more first fingers are sized, shaped, or configured differently than the one or more second fingers, wherein passages are defined between the fingers, wherein the seal remover is configured to be coupled to a distal end of an operative portion of a tool, wherein the tool is configured to be operated to rotate the seal remover in relation to the cap seal so that the fingers remove the cap seal from the fastener, and wherein removed portions of the cap seal are discharged through and out of the passages.

Clause 2. The system of Clause 1, wherein the one or more first fingers comprise one first finger, and the one or more second fingers comprise three second fingers.

Clause 3. The system of Clauses 1 or 2, wherein the one or more first fingers comprise a flat distal tip, and wherein the one or more second fingers comprise a groove.

Clause 4. The system of Clause 3, wherein the groove comprises an arcuate base.

Clause 5. The system of Clauses 3 or 4, wherein the groove is outwardly angled.

Clause 6. The system of any of Clauses 1-5, wherein one or both of the one or more first fingers or the one or more second fingers comprise serrations.

Clause 7. The system of any of Clauses 1-6, further comprising the tool.

Clause 8. The system of Clause 7, wherein the seal remover is integrally formed with the distal end of the operative portion of the tool.

Clause 9. The system of Clause 7, wherein the seal remover is removably secured to the distal end of the operative portion of the tool.

Clause 10. The system of any of Clauses 7-9, wherein the tool comprises an actuator coupled to a proximal end of the operative portion.

Clause 11. The system of any of Clauses 1-10, wherein the fingers are deflectable and configured to frictionally engage the cap seal.

Clause 12. The system of any of Clauses 1-11, wherein the seal remover is formed from a polymer.

Clause 13. The system of any of Clauses 1-12, wherein the seal remover is formed from one or more of nylon, rubber, polyetherimide, or polyacetal.

Clause 14. The system of any of Clauses 1-13, wherein the fingers are disposed around a central receiving chamber configured to receive the cap seal.

Clause 15. A method for removing a cap seal from a fastener, the method comprising:

coupling a seal remover to a distal end of an operative portion of a tool, wherein the seal remover includes fingers outwardly extending from a base, wherein the fingers include one or more first fingers and one or more second fingers, wherein the one or more first fingers are sized, shaped, or configured differently than the one or more second fingers, and wherein passages are defined between the fingers;

operating the tool to rotate the seal remover in relation to the cap seal;

removing the cap seal by said operating; and discharging removed portions of the cap seal through and out of the passages.

Clause 16. The method of Clause 15, wherein the one or more first fingers comprise a flat distal tip, and wherein the one or more second fingers comprise a groove.

Clause 17. A system for removing a cap seal from a fastener, the system comprising:

a tool including an operative portion having a distal end, a proximal end, and an actuator coupled to the proximal end; and a seal remover including fingers outwardly extending from a base, wherein the fingers include one or more first fingers and one or more second fingers, wherein the one or more first fingers are sized, shaped, or configured differently than the one or more second fingers, wherein passages are defined between the fingers, wherein the fingers are disposed around a central receiving chamber configured to receive the cap seal, and wherein the seal remover is formed from one or more of nylon, rubber, polyetherimide, or polyacetal, wherein the seal remover is coupled to the distal end of the operative portion of the tool, wherein the tool is configured to be operated to rotate the seal remover in relation to the cap seal so that the fingers remove the cap seal from the fastener, and wherein removed portions of the cap seal are discharged through and out of the passages.

Clause 18. The system of Clause 17, wherein the one or more first fingers comprise one first finger, and the one or more second fingers comprise three second fingers.

Clause 19. The system of Clauses 17 or 18, wherein the one or more first fingers comprise a flat distal tip, and wherein the one or more second fingers comprise a groove.

Clause 20. The system of Clause 19, wherein the groove comprises an arcuate base, and wherein the groove is outwardly angled.

As described herein, examples of the present disclosure provide efficient and effective systems and methods for removing a cap seal from a fastener.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for removing a cap seal from a fastener, the system comprising:

a seal remover including fingers outwardly extending from a base, wherein the fingers are deflectable and configured to frictionally engage the cap seal, wherein the fingers include one or more first fingers and one or more second fingers, wherein the one or more first fingers are sized, shaped, or configured differently than the one or more second fingers, wherein passages are defined between the fingers, wherein the seal remover is configured to be coupled to a distal end of an operative portion of a tool, wherein the tool is configured to be operated to rotate the seal remover in relation to the cap seal so that the fingers remove the cap seal from the fastener, and wherein removed portions of the cap seal are discharged through and out of the passages.

2. The system of claim 1, wherein the one or more first fingers comprise one first finger, and the one or more second fingers comprise three second fingers.

3. The system of claim 1, wherein the one or more first fingers comprise a flat distal tip, and wherein the one or more second fingers comprise a groove.

4. The system of claim 3, wherein the groove comprises an arcuate base.

5. The system of claim 3, wherein the groove is outwardly angled.

6. The system of claim 1, wherein one or both of the one or more first fingers or the one or more second fingers comprise serrations.

7. The system of claim 1, further comprising the tool.

8. The system of claim 7, wherein the seal remover is integrally formed with the distal end of the operative portion of the tool.

9. The system of claim 7, wherein the seal remover is removably secured to the distal end of the operative portion of the tool.

10. The system of claim 7, wherein the tool comprises an actuator coupled to a proximal end of the operative portion.

11. The system of claim 1, wherein the seal remover is formed from a polymer.

12. The system of claim 1, wherein the seal remover is formed from one or more of nylon, rubber, polyetherimide, or polyacetal.

13. The system of claim 1, wherein the fingers are disposed around a central receiving chamber configured to receive the cap seal.

14. A method for removing a cap seal from a fastener, the method comprising:

coupling a seal remover to a distal end of an operative portion of a tool, wherein the seal remover includes fingers outwardly extending from a base, wherein the fingers are deflectable and configured to frictionally engage the cap seal, wherein the fingers include one or more first fingers and one or more second fingers, wherein the one or more first fingers are sized, shaped, or configured differently than the one or more second fingers, and wherein passages are defined between the fingers;

operating the tool to rotate the seal remover in relation to the cap seal;

removing the cap seal by said operating; and discharging removed portions of the cap seal through and out of the passages.

15. The method of claim 14, wherein the one or more first fingers comprise a flat distal tip, and wherein the one or more second fingers comprise a groove.

16. A system for removing a cap seal from a fastener, the system comprising:

a tool including an operative portion having a distal end, a proximal end, and an actuator coupled to the proximal end; and a seal remover including fingers outwardly extending from a base, wherein the fingers are deflectable and configured to frictionally engage the cap seal, wherein the fingers include one or more first fingers and one or more second fingers, wherein the one or more first fingers are sized, shaped, or configured differently than the one or more second fingers, wherein passages are defined between the fingers, wherein the fingers are disposed around a central receiving chamber configured to receive the cap seal, and wherein the seal remover is formed from one or more of nylon, rubber, polyetherimide, or polyacetal, wherein the seal remover is coupled to the distal end of the operative portion of the tool, wherein the tool is configured to be operated to rotate the seal remover in relation to the cap seal so that the fingers remove the cap seal from the fastener, and wherein removed portions of the cap seal are discharged through and out of the passages.

17. The system of claim 16, wherein the one or more first fingers comprise one first finger, and the one or more second fingers comprise three second fingers.

18. The system of claim 16, wherein the one or more first fingers comprise a flat distal tip, and wherein the one or more second fingers comprise a groove.

19. The system of claim 18, wherein the groove comprises an arcuate base.

20. The system of claim 19, wherein the groove is outwardly angled.

* * * * *